March 16, 1965     H. W. PADWICK     3,173,494
OVERLOAD RELEASE TRIP FOR CULTIVATOR SHANKS
Filed April 4, 1963
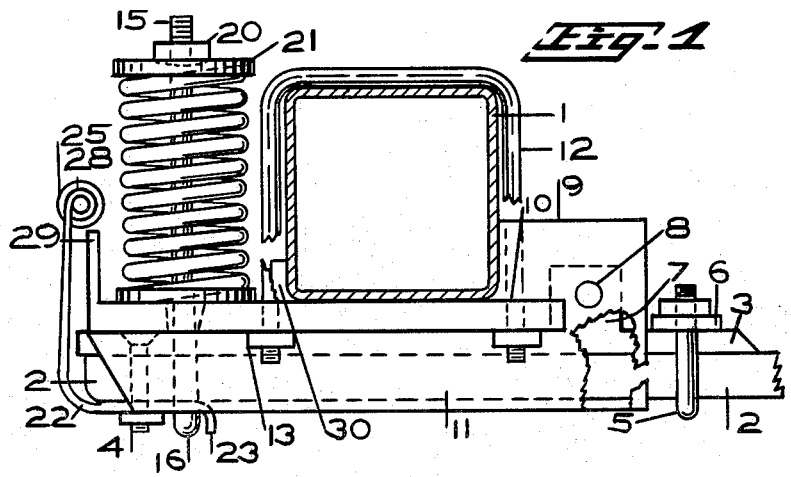
Fig. 1
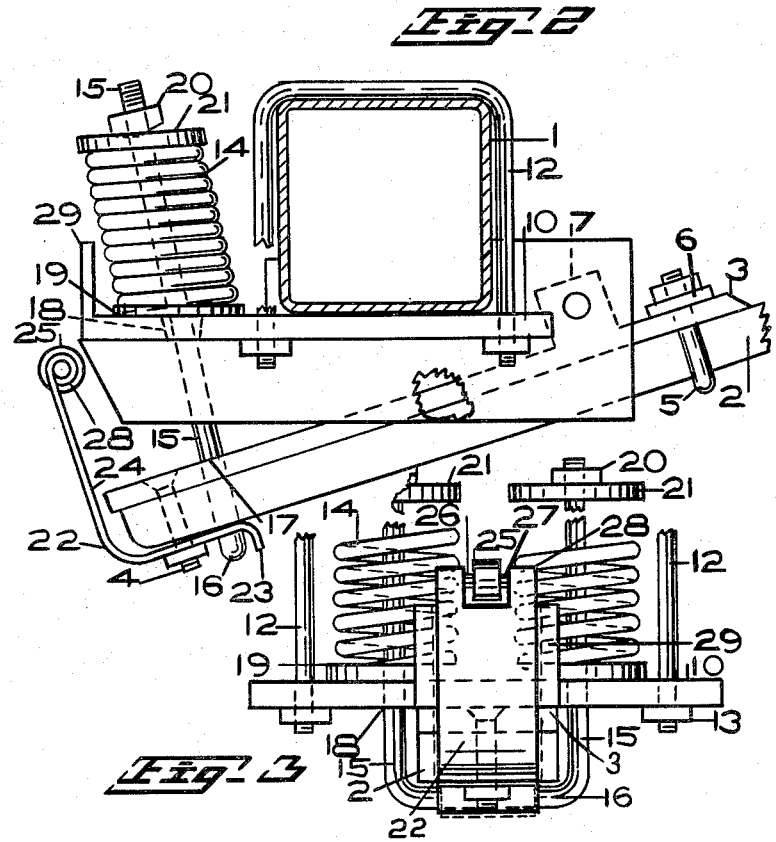
Fig. 2
Fig. 3

United States Patent Office 3,173,494
Patented Mar. 16, 1965

3,173,494
OVERLOAD RELEASE TRIP FOR CULTIVATOR SHANKS
Herbert W. Padwick, 93 Calder Crescent, Regina, Saskatchewan, Canada
Filed Apr. 4, 1963, Ser. No. 270,635
5 Claims. (Cl. 172—265)

This invention relates to soil working implements, having particular reference to the mountings for the shanks that carry the soil working elements of the implement.

In implements of this character, such as plows, cultivators and the like, one or more shanks carrying the soil working elements are mounted on a cross frame bar or bars of the implement, pivoted thereon to swing vertically in avoiding obstructions, such as stones imbedded in the ground, and such shanks are held by spring means or the like with the points or shovels on the shanks traveling in working relation to the ground, the springs allowing the shanks to pivot upward when the obstruction is encountered.

In this the cultivator point or shovel is affected by minor obstructions and the vibrations inherent in such machines, and does not travel parallel to the ground level, uneven cultivating resulting, since the cultivating shanks are operating directly against the springs.

It is the object of the present invention to provide means for holding the shanks against such movement unless a major obstruction is encountered that would necessitate the shanks rising to clear the obstruction, and by so doing obtain uniform depth of cultivating.

For this an improved mounting for a shank is provided, embodying a locking attachment by which the point or shovel carried by the shank is constrained for travel at a uniform depth in the soil, but the shank is automatically releasable when an obstruction is encountered such that the shank would have to rise for the point or shovel to clear the obstruction.

The mounting also is of a character permitting use of springs of economical strength and size, and includes safety provisions for the operator in the event that an excessive rise of a shank to clear an obstruction should cause the shank mounting to break.

Other features and advantages of the invention will become apparent by reference to the accompanying description taken in conjunction with the drawings.

In the drawings, wherein is shown a preferred embodiment of the invention,

FIG. 1 is a side view of a shank mounting embodying the improvements and shown in attachment to an implement cross bar, and including a fragment of a shank held in a normal working position, and with parts of the mounting broken away, and the cross bar in section.

FIG. 2 is a side view similar to the showing in FIGURE 1, but with trip arm released and the shank pivoted upward as it would be when a point or shovel carried by the shank has encountered an obstruction and the shank has moved upward in clearing it.

FIG. 3 is a part end view of the mounting taken by itself, shown with parts omitted and parts broken away.

Having reference to the drawings, at 1 is indicated a cross bar of an implement frame, it being understood that in field implements a series of shanks would be mounted at uniform intervals on the cross bar, and that one or more cross bars might be used. The present showing is limited to one shank mounting of such a series and includes an upper end 2 of a shank mounted on the cross bar.

The shank mounting includes a mounting plate 3 that forwardly attaches on the shank end 2 by a countersunk bolt 4 and rearwardly by a U bolt 5 engaging a cross plate 6. The mounting plate includes an integral pivot block 7 by which it attaches by a pin 8 that passes through the block and through upstanding flanges 9 fixed spaced apart to a base plate 10, the plate 10 including spaced depending guide flanges 11 between which the mounting plate 3 is carried.

The base plate 10 is attached on the beam 1 by U clamps 12 that engage the base plates and are secured thereto by nuts 13 threaded on the clamp legs.

The springs cushioning the upward movement of the shank 2, and normally holding the shank with its point or shovel in working relation to the ground, consist of a pair of coiled springs 14 mounted on legs 15 that are integrally formed as a unit by a connecting bend 16. These legs pass through openings, as at 17, in the shank 2 and shank mounting plate 3 and openings at 18 in the base plate 10 that register with the openings 17. The springs 14 rest on a plate 19 through which the legs 15 pass and are held at their upper ends by nuts 20 threaded on the legs and with collars 21 interposed between the nuts and springs. These springs normally hold the shank mounting plate 3 in intimate contact with the under face of the base plate 10, in which position the shank 2 would be in soil working position. But when the shank rises, as in clearing an obstruction (FIG. 2) pivoting on the pin 8, the springs are compressed, as in FIGURE 2, for which the openings 18 would be tapered to allow the legs 15 to tilt forward in the base plate 10.

For securing the shank 2 normally held in working position, as in FIGURE 1, a locking arm 22 is attached on the bolt 4, the arm including a tail 23 engaging the bend 16 of the legs 15. The arm 22 has an upstanding portion 24 on which is mounted a roller 25 set in an opening 26 (FIG. 3) cut in the arm and mounted free to turn on a pin 27 for which the upper end portions 28 of the arm are turned back on themselves forming eyes in which the pin engages.

On the rear end of the base plate 10 is an integral upstanding arm 29 with which the roller 25 is engageable to hold the shank 2 in working position with the mounting plate 3 bearing against the under side of the base plate 10. For this the axis of the roller 25 must align with the top of the arm 29, approximately one eighth of an inch from the front edge of the top of the arm being the most desirable alignment.

There is further provided an integral thrust block 30 on the base plate 9 that bears against the frame cross bar 1 taking the thrust load off the U clamps 12.

In the use of the device when the shank 2 is in working position, as in FIGURE 1, it is held there normally by the springs 14, but in addition the roller 25 is engaged on the upper end of the arm 29. This holds the shank in working position, and any movement of the shank rearwardly upward is prevented by the roller. But when an obstruction is encountered that necessitates the shank rising to clear the obstruction, the added pressure disengages the roller from the arm 29 and the shank is free to rise, but in doing so compresses the springs 14, which, when the obstruction is cleared, pulls upward on the legs 15 and moves the shank back to its working position, as in FIGURE 1. This added pressure on the shank draws inward on the lower end of the arm 22 and moves the upper portion 24 of the arm outward in disengaging the roller, but the roller holds the mounting plate and shank against a normal working pressure on the shank and the vibration of the implement.

What I claim and wish to secure by Letters Patent is:
1. A shank mounting for a soil working implement, said implement having a cross frame bar, and said mounting comprising a base plate, means attaching the base plate on the underside of the cross bar projecting forwardly, said base plate having depending flanges spaced apart, upwardly extending flanges on the rear ends of said base plate, a mounting plate attached on the upper side of the forward end portion of the shank, means rearwardly on the mounting plate pivotally attaching said plate between the upstanding portions of the flanges, spring means on the base plate forwardly engaging and holding the shank with the mounting plate bearing against the under side of the base plate, an arm fixed to the forward end portion of the shank extending upwardly, and a roller on the upper end of said arm, the base plate having an upstanding arm portion against the upper end of which the roller bears when the shank is held by the spring means with the mounting plate on the shank bearing against the under side of the base plate.

2. A shank mounting as set out in claim 1 in which the spring means includes a pair of legs with a connecting bend engaging the shank with said legs projecting upwardly through the base plate and a coiled spring on each leg above the base plate, said springs being compressible by a downward movement of the forward end of the shank.

3. In a soil working implement having a cross bar on which the upper end of a shank for carrying soil working elements is mounted and including a base plate attached on the under side of the cross bar and to which the shank is pivotally mounted rearwardly of the cross bar with the forward end portion of the shank extending in advance of the cross bar, overload release means engaging the forward end of the shank with the base plate, said means comprising an upstanding arm attached to the forward end of the shank, a roller mounted on the upper end of the arm, and integral means on the forward end portion of the base plate with which the roller is engageable to oppose rearward upward pivotal movement of the shank and from which the roller may disengage by upward pressure on the shank.

4. A shank mounting as set out in claim 3 and including flanges fixed to the base plate, said flanges having spaced portions depending below the base plate between which the shank is mounted and rearward upstanding portions, and the pivotal mounting of the shank includes a mounting plate fixed to the upper side of the shank, said mounting plate bearing against the under side of the base plate when the upstanding arm on the shank has its roller engaged with the integral means on the base plate, a pivot block on the mounting plate, and means pivotally engaging the pivot with the rearward upstanding portions of the mounting plate flanges.

5. A soil working implement as set out in claim 3 and in which the integral means comprise an upstanding arm on the forward end of the base plate, and the roller is mounted on the upstanding arm of the shank offset rearwardly by which the axis of the roller is in opposing relation to the upper end of the base plate upstanding arm inward of the forward edge of said base plate upstanding arm.

References Cited by the Examiner
UNITED STATES PATENTS
2,857,833   10/58   Rolf _____ 172—710

T. GRAHAM CRAVER, *Primary Examiner.*